United States Patent
Gueret et al.

(10) Patent No.: US 7,144,445 B2
(45) Date of Patent: Dec. 5, 2006

(54) USE OF AN ADSORBENT IN SOLID FOAM FORM FOR THE PURIFICATION OR SEPARATION OF GASES

(75) Inventors: Vincent Gueret, Magny les Hameaux (FR); Serge Moreau, Vélizy (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 330 days.

(21) Appl. No.: 10/361,166

(22) Filed: Feb. 7, 2003

(65) Prior Publication Data

US 2003/0145726 A1 Aug. 7, 2003

(30) Foreign Application Priority Data

Feb. 7, 2002 (FR) .......................................... 02 01506

(51) Int. Cl.
*B01D 53/047* (2006.01)

(52) U.S. Cl. ................. 95/96; 95/106; 95/117; 95/128; 95/139; 95/143; 95/900

(58) Field of Classification Search ............ 95/96–106, 95/117.1, 128, 130, 139, 143, 900–903; 96/135, 96/153, 154; 55/512, 524, DIG. 42, 514
See application file for complete search history.

(56) References Cited

U.S. PATENT DOCUMENTS

| 3,217,715 | A | * | 11/1965 | Berger et al. ................ 131/342 |
| 3,474,600 | A | * | 10/1969 | Tobias ......................... 55/524 |
| 3,538,020 | A | * | 11/1970 | Heskett et al. ............... 210/496 |
| 3,545,622 | A | * | 12/1970 | Sakhnovsky et al. ....... 210/496 |
| 3,704,806 | A | * | 12/1972 | Plachenov et al. .......... 206/204 |
| 3,721,072 | A | * | 3/1973 | Clapham ..................... 96/153 |
| 3,865,758 | A | | 2/1975 | Yoshida et al. |
| 3,925,248 | A | * | 12/1975 | Moroni et al. .............. 502/159 |
| 4,013,566 | A | * | 3/1977 | Taylor ......................... 502/62 |
| 4,220,553 | A | * | 9/1980 | Krause ........................ 502/402 |
| 4,510,193 | A | * | 4/1985 | Blucher et al. ............. 428/196 |
| 4,518,704 | A | * | 5/1985 | Okabayashi et al. ........ 502/80 |
| 4,800,190 | A | * | 1/1989 | Smolik ........................ 502/416 |
| 4,906,263 | A | | 3/1990 | Von Blucher et al. |
| 4,981,501 | A | * | 1/1991 | Von Blucher et al. ........ 96/153 |
| 4,992,084 | A | * | 2/1991 | Von Blucher et al. ........ 96/131 |
| 5,033,465 | A | * | 7/1991 | Braun et al. ............ 128/205.27 |
| 5,104,425 | A | * | 4/1992 | Rao et al. .................... 95/47 |
| 5,350,443 | A | * | 9/1994 | von Blucher et al. ........ 96/135 |
| 5,395,428 | A | * | 3/1995 | von Blucher et al. ........ 95/104 |
| 5,453,118 | A | * | 9/1995 | Heiligman .................. 96/147 |
| 5,478,377 | A | * | 12/1995 | Scavnicky et al. ......... 96/17 |
| 5,542,968 | A | * | 8/1996 | Belding et al. ............. 96/125 |
| 5,547,481 | A | * | 8/1996 | Herding et al. ............. 55/523 |
| 5,616,169 | A | * | 4/1997 | de Ruiter et al. ........... 95/90 |
| 5,626,036 | A | | 5/1997 | Koeberle |
| 5,662,728 | A | * | 9/1997 | Groeger ....................... 96/153 |
| 5,665,148 | A | * | 9/1997 | Muhlfeld et al. ........... 96/153 |
| 5,776,385 | A | * | 7/1998 | Gadkaree et al. .......... 264/29.5 |
| 5,871,569 | A | * | 2/1999 | Oehler et al. ............... 96/153 |
| 6,165,252 | A | * | 12/2000 | Kendall ....................... 95/90 |
| 6,231,644 | B1 | * | 5/2001 | Jain et al. .................... 95/96 |
| 6,277,178 | B1 | * | 8/2001 | Holmquist-Brown et al. . 96/135 |
| 6,277,179 | B1 | * | 8/2001 | Reymonet ................... 96/153 |
| 6,402,819 | B1 | * | 6/2002 | De Ruiter et al. .......... 96/153 |
| 6,429,165 | B1 | * | 8/2002 | Nastke et al. .............. 502/159 |
| 6,464,756 | B1 | | 10/2002 | Plee |
| 6,464,761 | B1 | * | 10/2002 | Bugli .......................... 96/135 |
| 6,485,546 | B1 | * | 11/2002 | Fuchs .......................... 96/135 |
| 2001/0027723 | A1 | * | 10/2001 | Jain et al. .................... 95/96 |
| 2003/0041733 | A1 | * | 3/2003 | Seguin et al. ............... 96/108 |

FOREIGN PATENT DOCUMENTS

| DE | 2244685 A | | 4/1973 |
| DE | 3719415 A1 | | 12/1988 |
| DE | 19834311 A1 | | 2/2000 |
| EP | 0699884 A | | 3/1996 |
| EP | 0855209 A | | 7/1998 |
| EP | 1110593 A | | 6/2001 |
| EP | 1222 961 A2 | | 7/2002 |
| EP | 1222 961 A3 | | 7/2002 |
| GB | 2032298 A | * | 5/1980 |
| GB | 2126123 A | * | 3/1984 |
| GB | 2138695 A | * | 10/1984 |

OTHER PUBLICATIONS

French Search Report to FR 0201506.

* cited by examiner

*Primary Examiner*—Robert H. Spitzer
(74) *Attorney, Agent, or Firm*—Linda K. Russell

(57) ABSTRACT

Process for purifying or separating a gas or gas mixture using a monolithic adsorbent for the separation or purification of gases or gas mixtures, having a cellular structure with open porosity in the form of a solid foam permeable to the gas molecules. The gas phase of the adsorbent possesses an essentially convex structure and the solid phase an essentially concave structure. The solid foam has a density of greater than or equal to 500 kg/m$^3$ and an open porosity of between 20 and 60%. The gas is air or an $H_2/CO$ mixture. The process is of the VSA, PSA or TSA type. This process can be used in particular in OBOGS-type systems to supply passengers of the vehicle or a device participating in the traction of the vehicle and/or in its electrical supply, in particular a fuel cell. This process can also be used in medical oxygen concentrators.

87 Claims, 3 Drawing Sheets

USE OF AN ADSORBENT IN SOLID FOAM FORM FOR THE PURIFICATION OR SEPARATION OF GASES

This application claims the benefit of priority under 35 U.S.C. § 119 (a) and (b) to French Application No. 020150, filed Feb. 7, 2002, and European Patent No. EP 1,338,324 filed Jan. 20, 2003, the entire contents of which are both incorporated herein by reference.

BACKGROUND

The present invention relates to a process for purifying or separating gases or gas mixtures using a monolithic adsorbent having a cellular structure with an open porosity in the form of a solid foam permeable to the gas molecules.

At the present time, industrial adsorbents are used in the form of a granular bed. In this configuration, the bed of adsorbent acts as a loose stack of particles of any shape: beads, extrudates or more complex shapes.

This arrangement may be defined as consisting of locally an essentially convex solid phase coexisting with an essentially concave gas phase occupying the space left free by the solid.

One development approach consists in making what are known as honeycomb monolith adsorbents, essentially consisting of a solid structure and a gas phase placed essentially linearly in what are called "channels".

A similar approach uses lamellar structures in the form of "multilayers", with the two phases lying in sheets with a two-dimensional gas flow.

However, the basic problem of solid-phase adsorption processes, to which each of the three known arrangements does provide a solution, consists in accomplishing good solid/gas material exchange while maintaining a low head loss.

Thus, a granular bed ensures good material transfer in the gas phase but at the cost of a high head loss.

Moreover, it is difficult to greatly improve the situation as the primary cause thereof is the large size of the solid phase relative to the gas phase.

Furthermore, the solution consisting in reducing the size of the particles quickly reaches its limit due to the head loss increasing excessively. In fact, the convex, or even spherical, structure of the solid phase means that there is a low surface-to-volume ratio intrinsically unfavourable to diffusion in the solid and a high surface-to-volume ratio in the gas phase, whereas in fact it is the opposite that ought to be achieved.

From its standpoint, a honeycomb or multilayer structure is essentially linear and the two phases are therefore in an equivalent arrangement. The flow of the gas is much more uniform than in the case of a granular bed, which results in a low head loss. However, it is found in practice that the transport of matter in the gas phase is not truly satisfactory because of this uniform, that is to say laminar, flow unless channels having a size of around 0.1 or 0.2 mm are used, which poses manufacturing problems.

Starting from this point, the problem that arises is then to be able to have a gas separation or purification process using an adsorbent possessing optimized mass exchange between the gas phase and the solid phase, while maintaining the head losses at a low level when using this adsorbent to separate or purify a gas or gas mixture, in particular a PSA or VSA process, to produce, for example, oxygen or hydrogen or a TSA process used, for example, to remove carbon dioxide, nitrogen oxides and/or hydrocarbons, or water, from gases such as air or $H_2/CO$ mixtures.

SUMMARY

The object of the present invention is therefore to try to solve this problem by providing a process using an improved adsorbent that can be used to purify or separate gases, such as air.

The solution of the invention is therefore a process for purifying or separating a gas or gas mixture using a monolithic adsorbent for the separation or purification of gases or gas mixtures, having a cellular structure with an open porosity in the form of a solid foam permeable to the gas molecules.

According to the invention, the solid foam has a density of greater than or equal to 500 kg/m$^3$ and an open porosity of between 20 and 60%.

The porosity is said to be open when there is a high inter-connectivity between the cells or bubbles of said monolith, that is to say when it is possible to go from one pore to another by passing only through the gas phase without having to pass through the solid phase.

The bulk density is, moreover, the ratio of the mass of the monolith to the overall volume that it occupies. The bulk density is calculated by weighing the monolith and expressing this mass with respect to its volume calculated from the external dimensions of the monolith, whether it be parallelepipedal, cylindrical, annular or of any other general geometrical shape.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
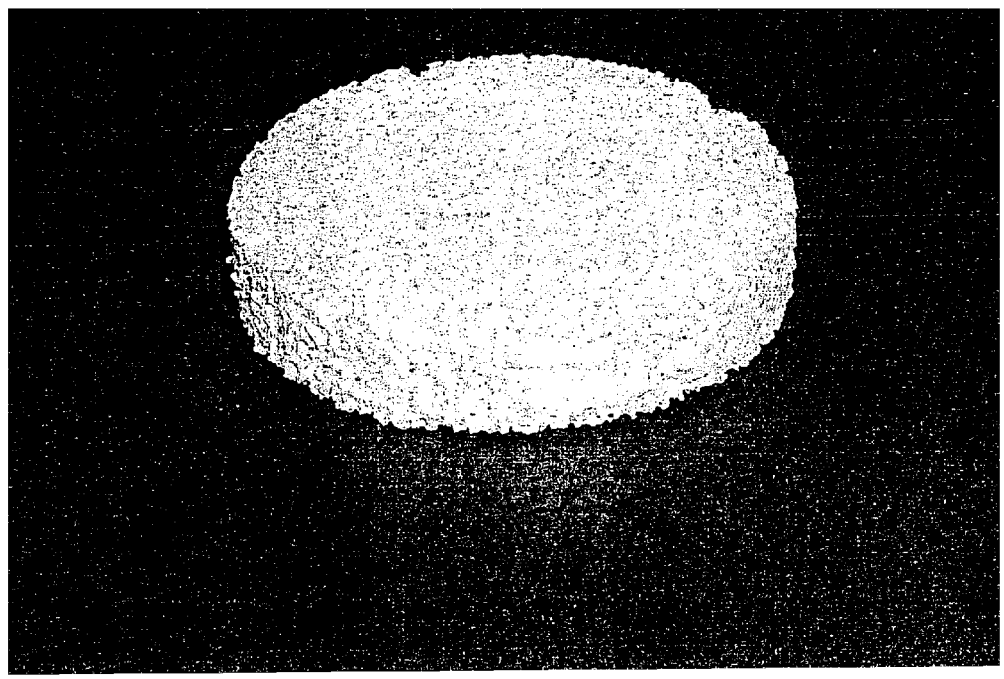
FIG. 1 illustrates one embodiment a structure made of a permeable foam solid adsorbent as according to the current invention.

Depending on the case, the process of the invention may include one or more of the following technical features:

- the gas phase of the adsorbent possesses an essentially convex structure and the solid phase an essentially concave structure;
- the size of the pores of the gas phase of the adsorbent is between 0.1 and 10 mm, preferably between 0.2 and 1.5 mm;
- the open porosity of the adsorbent is between 20 and 60%, preferably between 30 and 50%, of the volume of the monolith;
- the density of the adsorbent is between 500 kg/m$^3$ and 900 kg/m$^3$, preferably greater than or equal to 600 kg/m$^3$, and/or less than or equal to 750 kg/m$^3$;
- the adsorbent consists of a solid phase comprising at least 40% by weight of at least one adsorbent material comprising a zeolite, silica gel, activated alumina or active carbon, and the balance consisting of at least one mechanical reinforcement material and/or a material having particular thermal properties;

the solid phase of the adsorbent comprises at least 60% by weight of at least one adsorbent material;

the mechanical reinforcement material and/or the material having particular thermal properties of the adsorbent is (are) chosen from an inorganic oxide, a ceramic, a metal, carbon or a polymer;

the adsorbent contains metal cations in its zeolitic phase;

the adsorbent contains metal cations chosen from alkali metals and alkaline-earth metals, transition metals and lanthanides, preferably lithium, calcium, sodium or potassium;

the gas is air;

the gas is a mixture containing $H_2$ and CO, or other compounds;

at least one of the gases chosen from oxygen, hydrogen, $CH_4$, CO, $CO_2$ or nitrogen is produced;

at least one impurity of the group formed by $H_2O$, $CO_2$, $N_xO_y$, and unsaturated or saturated hydrocarbons is removed;

it is chosen from VSA, PSA or TSA processes, whether they are carried out on the ground or on board aircraft using the OBOGS (On-Board Oxygen Generating System) type technology or on board a terrestrial or sea-going vehicle, the oxygen production system being intended to deliver an $O_2$-enriched gas stream to one or more passengers and/or to one or more devices installed on board the vehicle, these devices optionally contributing to the traction of the vehicle, for example an internal combustion engine or a fuel cell, and/or to its electrical supply, for example a fuel cell;

the stream to be purified is a stream of air and at least some of the air stripped of at least some of said impurities is subjected to at least one cryogenic distillation step;

the gas stream is at a temperature of between $-40°$ C. and $+80°$ C., preferably between $-10°$ C. and $+60°$ C. and even more preferably between $10°$ C. and $+50°$ C.;

the adsorption pressure is between 1 bar and 60 bar, preferably between 3 bar and 35 bar, even more preferably between 6 bar and 30 bar;

the desorption pressure is between 0.2 bar and 60 bar, preferably between 0.25 bar and 6 bar;

the flow rate of the gas stream is between 0.1 and $10^6$ $Nm^3/h$, preferably $10^3$ and $5 \times 10^5$ $Nm^3/h$;

the regeneration temperature is between $-20°$ C. and $400°$ C., preferably between $20°$ C. and $250°$ C. and preferentially between $20°$ C. and $80°$ C.;

the gas for regenerating the adsorbent is nitrogen or a nitrogen/oxygen mixture containing a small proportion of oxygen (a few vol %), preferably the nitrogen/oxygen mixture used to regenerate the adsorbent is a residual gas or a waste gas coming from a cryogenic air separation unit;

the regeneration gas is oxygen containing a few % of nitrogen, preferably the nitrogen/oxygen mixture used to regenerate the adsorbent is a gas coming from an adsorber capable of separating oxygen from air;

the regeneration gas is hydrogen containing less than 10 ppm of impurities, preferably the gas used to regenerate the adsorbent is a gas coming from an adsorber capable of separating the hydrogen from a mixture containing this; and the process of the invention is employed in at least one adsorber, preferably in at least two adsorbers operating alternately.

Figure 2:
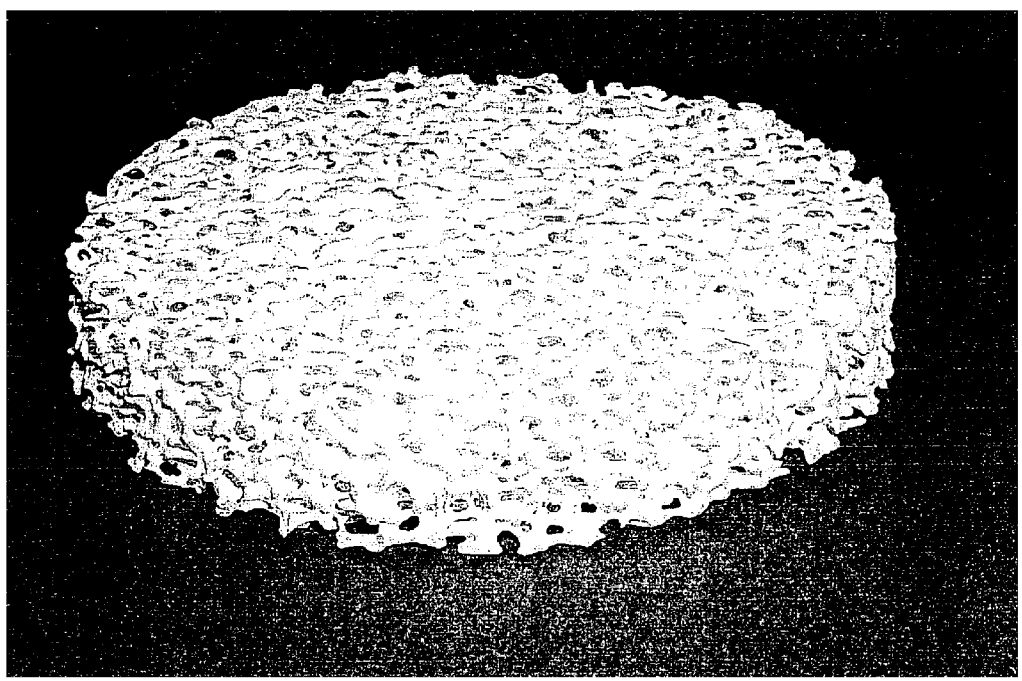
FIG. 2 illustrates a second embodiment of a structure made of a permeable foam solid adsorbent as according to the current invention.
Figure 3:
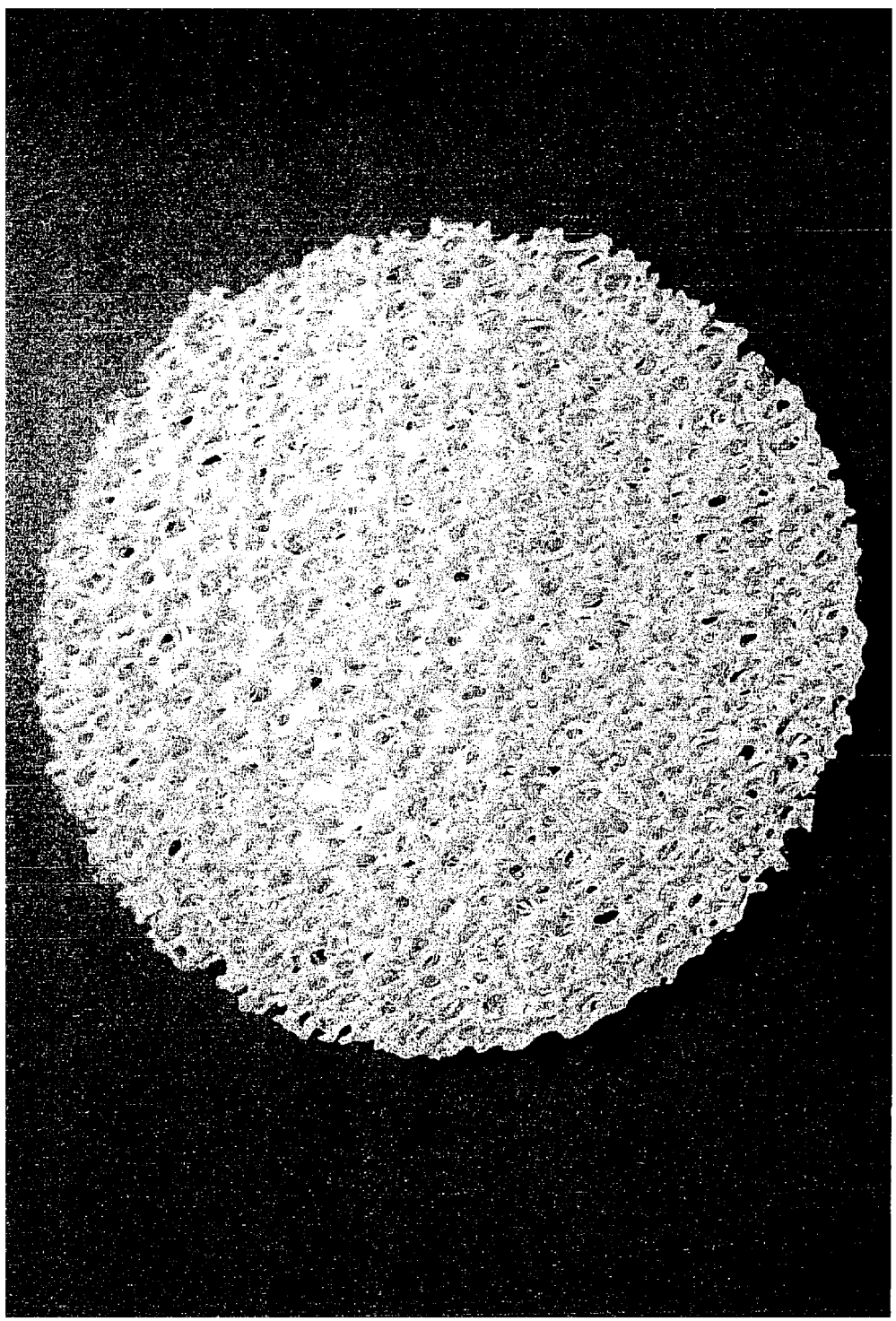
FIG. 3 illustrates another embodiment of a structure made of a permeable foam solid adsorbent as according to the current invention.

Several embodiments of the invention are represented in FIGS. 1 to 3 appended hereto in which it is in the form of a structure made of a permeable foam of solid adsorbent, that is to say, a cellular structure with open porosity.

Such a three-dimensional structure may be represented as a granular bed with reversed phases, that is to say in which the solid and gas phases would be exchanged.

A volume such that the curvature of the surface is directed essentially towards the inside of the volume is called a convex volume, whereas if the curvature is directed towards the outside it is called a concave volume.

The gas phase is convex and quite complicated, so that a certain amount of turbulence is established therein which will lead to good mass- and heat-transfer, but, however, quite open so that the head loss is low.

The solid phase is concave, and therefore with a good surface-to-volume ratio resulting in high mass transfer.

Moreover, the invention results in a monolithic adsorbent which is not subject to the action of movement and which, consequently, can support high gas flow velocities, that is to say at least 1 m/s actual.

The size of the "bubbles" of the foam may be tailored to the constraints of the particular process—in general, the bubbles have a diameter of between 0.1 and 10 mm.

The porosity of the medium may also be tailored—in general it is between 10 and 60%.

The adsorbent solid phase consists of a specific adsorbent, such as a zeolite, an active carbon, an activated alumina or an activated silica gel.

The presence of a binder may be necessary in order to ensure strength, for example a binder of the alumina, clay or silica type. The binder may have been at least partly converted into the adsorbent phase, for example in the case of an agglomerated zeolite in which the clay binder has been converted into a zeolite identical to or different from the principal phase.

It is also possible to use a hybrid structure consisting of a rigid structure covered by a particular active phase, different from the underlying phase, for the purpose, for example, of separating the mechanical retention function from the adsorption function. The rigid structure may consist of a ceramic oxide of the silica or alumina kind, a metal or a polymer. The active phase must preferably represent at least 70% by weight of the complete structure of the monolith.

More complex structures may also be used, for example a metal foam on which an adsorbent phase is deposited. In this case, the metal structure fulfils two functions, namely mechanical reinforcement and thermal conduction.

The metal of the structure may be copper, aluminium, iron, steel or an alloy chosen according to the chosen thermal conductivity, mechanical strength, density, porosity and compatibility with the adsorbent phase.

The metal phase may be covered with an adherent ceramic or oxide phase for the purpose of facilitating and/or enhancing the deposition of the adsorbent phase.

The adsorbent of the invention may be manufactured by the known techniques already used to prepare metal or ceramic foams. In this regard, reference may be made, for example, to the following documents: *Monolithic catalyst supports with foam structure*, A. N. Leonov et al., React. Kinet. Catal. Lett., Vol. 60, No. 2, p. 259–267, 1997 or *Processing of Porous Ceramics*, J. Saggio-Woyansky et al., American Ceramic Society Bulletin, Vol. 71, No. 11, p. 1674–1682, 1992.

The basic principle consists in preparing an organic foam, such as a polyurethane foam, on which the first, active or support, phase is deposited and then in removing this organic phase by thermolysis.

The adsorbent may also be manufactured using the gel or aerogel technique.

The basic principle consists in gelling a liquid phase and then, optionally after rinsing, in removing the solvent.

The structural parameters, such as the size of the bubbles, the porosity or the shape of the monolith, may be adjusted according to the formation of the foam and/or the deposition of the support phase or active phase.

To take an example, the adsorbent shown in FIGS. 1 to 3 is composed of alumina.

In practice, all the adsorption systems using a granular bed or a honeycomb or multilayer structure may advantageously be replaced with a particular embodiment of the invention which has the advantage of being easy to implement compared with the honeycomb or multilayer structures, which require the production of very uniform three-dimensional structures of very small size.

The monolithic adsorbent may consist of a single block or of a stack of several blocks. In the latter case, it is possible to use blocks having different properties. For example, it is possible to stack monoliths characterized by different porosities, bubble sizes, pore densities or chemical compositions (binder content, nature of the zeolite, nature and proportions of the cations, mechanical support), so as to optimize each slice of adsorber according to the stream that passes through it. It is also possible to vary the shape, the thickness or the average diameter of the blocks. It is also possible to produce a gradient of properties within a single block, such as for example a gradient of exchange rate or of porosity.

The monolithic nature of these adsorbent forms must be taken into account when handling them. This is because such formed adsorbents are rigid and a scratch, crack or loss of part of the mass cannot be spontaneously compensated for by a geometrical rearrangement. This may have important consequences, as preferential passages or dead volumes for the gas are then formed and these greatly degrade the performance of the adsorption unit.

Moreover, the monolithic adsorbents must be placed in the adsorbers and fixed thereto so as to eliminate any overall movement and any flow of gas outside the monolith, which would increase the abovementioned risk of degradation.

Another problem relates to the use of the ion exchange operation to which the monoliths may be subjected. Ion exchange consists in bringing the zeolitic adsorbent in contact with a solution of a salt to be exchanged, for example a lithium salt for the manufacture of a lithium faujasite. The ion exchange is, in this case, difficult and must be carried out with the adsorbent placed in a column. With a granular adsorbent, there is no major problem in filling the column and then in emptying it after exchange. On the other hand, in the case of a monolith, the difficulty of introducing the product into the column and removing it therefrom without damaging it is recognized, as is also the problem of the preferential passages between the monolith and the wall of the column. Activation of the monolith is also a problem in terms of handling, and the flow of gas through the monolith.

It may therefore be seen that the treatment, transportation, storage and installation of these monoliths are difficult, this being all the more so when these monoliths are of large size and complex structure. One possibility of alleviating this difficulty consists in increasing the binder content, but then there is a loss of capacity.

The invention also provides a solution to the problem of the brittleness of the monoliths, allowing easy handling, transportation, storage and installation, whatever the intrinsic strength of the material of which they are composed. The invention also allows the intrinsic capacity of the adsorbent material to be increased.

The invention proposes to surround the monolith with a rigid shroud capable of withstanding the mechanical shocks and stresses and also capable of being introduced as such into the adsorption columns. The monolith may then be handled and transported without any problem—adjustment in the adsorption column may be achieved by means of seals and shims. Optionally, the shroud may serve as adsorption column.

In fact, shrouding the monolith makes it possible to use combinations of binder and of active material that are too low to withstand their own weight by themselves, and therefore results in materials having a higher proportion of active material. For example, adsorbents having less than 10% by weight of binder may be produced. This also makes it possible to produce monoliths of very fine structure, for example channels of around 0.1 to 0.2 mm with walls from 0.05 to 0.5 mm, which do not possess the mechanical strength allowing them to form large structures.

To separate the gases or to purify them using the technique called PSA or TSA, the shroud must be able to withstand the temperature variations without contact with the monolith being degraded.

One procedure may, for example, be to introduce the "green" binder/adsorbent mixture formed in a metal or ceramic shell and then to bake the assembly in order to cure the binder and activate the adsorbent. During this operation, a purge gas may be made to flow through the passages of the adsorbent, allowing effective removal of the water and gases that are evolved. It is also possible to add a swelling agent which will press the monolith against the internal wall of the shell with, as consequence, solid adhesion, which is furthermore improved if necessary by a surface treatment of the metal. It is also possible to put the binder/adsorbent mixture in loose and to carry out the swelling in situ, for example in the case of a foam. Of course, the procedure may be carried out according to a hybrid protocol, such as filling the shell with a mixture of a non-monolithic cured foam and a foam precursor, and then carrying out the final foaming.

The heating may be carried out by the gas for purging the solid, or else by external heating by conduction or microwaves, or else by a combination.

Another method consists in baking the monolith separately, and then in introducing it into the shell, an adhesive (whether cold setting or hot setting) being used to fit the monolith against the internal wall. An alternative method consists in using a shell made of a shape-memory material which will shrink so as to fit around the monolith.

Furthermore, yet another method consists in rolling up a sheet of flexible material around the monolith, the baking and activation taking place before or afterwards. In all cases, it may be useful to use an adhesive which will bond the adsorbent to the shroud; the adhesive may be organic or mineral (a silicate).

It is possible to use the shroud directly as the adsorption column or else to place it inside a shell having enhanced mechanical properties. In the latter case, several monoliths may be placed in series. The shell may be fitted against the column by any means known to those skilled in the art: O-ring seals or gaskets, wedges, guides, rails, etc.

If it is desired to produce a radial-flow adsorber, a shroud consisting of two coaxial cylinders is produced, made of a permeable material, such as a mesh, grating or frit. This case is particularly indicated for permeable foams.

In general, the shrouded adsorbent has surfaces which must be impermeable to the gases and liquids, responsible for channelling the flow, and surfaces that are permeable to the gases and liquids via which surfaces the gas or liquid enters or leaves. The part impermeable to the gases and liquids may consist of any rigid impermeable material, such as a metal, ceramic or plastic. The part permeable to the gases and liquids may consist of any metal, mineral or organic permeable material produced so as to ensure flow of the gas, such as perforations, weaving, stamping. The part permeable to the gases and liquids may also contain no shroud.

Another advantage of a shrouded adsorbent is that it allows the adsorbent to be easily treated, for example in order to carry out ion exchange or activation. The shroud allows the exchange solution or the activation gas to percolate directly through the monolith, limiting the problem of sealing the inlet and the outlet. In the case of an in-column exchange, the shroud may serve to channel the exchange solution, or even serve as the complete support. In this case, it is then sufficient to ensure circulation of the exchange solution by a system of valves and pipes. In the preferred operating method, the column is placed as it is in the solution circuit and then removed after ion exchange.

Similarly, the adsorbent may be activated after ion exchange by making a hot gas, possibly dried and decarbonated, flow through the foam, the shroud serving at least to channel the activation gas, or even to provide the complete function of supporting the structure. Of course, all ways carrying out the activation or ion exchange or for bringing the adsorbent material into contact with a fluid in the column may be imported from granular bed treatment methods.

EXAMPLE

Let us consider a VPSA (Vacuum Pressure Swing Adsorption) cycle based on two adsorbers, used by an on-board device of the OBOGS type.

The high pressure was 3.06 bar absolute, the low pressure (vacuum) was 480 mbar absolute and the cycle was 2×4.4 s.

The cycle was divided into 4 main steps:
feed/production;
feed with part of the production serving for countercurrent elution of the second bottle;
countercurrent purging; and
countercurrent elution by the second bottle, which is put into production.

The second bottle underwent the same cycle, shifted by a half-cycle time.

This cycle was used to produce oxygen having a purity of about 81.5% from dry ambient air at 25° C. It was possible to carry out a preliminary step to dry the air, for example by passing it over an alumina bed.

The productivity was expressed as the amount of pure equivalent oxygen produced per unit volume of adsorbent.

The adsorbers were filled with superposed LiLSX zeolite foam discs, each being composed of 86% by weight of zeolite and 14% of inorganic binder and having an open porosity of 45%. The density of such a foam was about 560 kg/m$^3$. The average dimensions of the foam were 0.400 mm in the case of the strands and 0.360 mm in the case of the pores of the gas phase.

The foam elements were thus stacked over a height of 32 cm.

The performance of such a production unit was determined by simulation using adsorption process software taking account of the mass transfer by the LDF (Linear Driving Force) model and the head losses by the Ergun equation applied to the foam; see the work on catalytic foams by M. V. Twigg and J. T. Richardon, 2002, Trans IChemE, 80, Part A, pp. 183–189, *Theory and applications of ceramic foam catalysts* and J. T. Richardson, Y. Peng and D. Remue, 2000, Applied Catalysis A: General, 204, pp. 19–32, *Properties of ceramic foam catalyst supports: pressure drop*.

The LDF rate is controlled by a coefficient ak that can be calculated for simple adsorbent geometries, such as spheres, cylinders and planes. In the case of the foam, this coefficient was calculated by likening the strands of the foam to cylinders:

$$ak = \frac{8 \times \varepsilon \times D_p}{R^2}$$

where $D_p$ is the effective diffusivity taking into account the tortuosity $\tau$ and the pressure P:

$$D_p = D_m \tau / P$$

where $D_m$ is the molecular diffusivity with $D_m$=0.2 cm$^2$/s, $\tau$=4, P=3 bar, $\varepsilon$=0.35 and R=0.02 cm.

An ak value of about 120 s$^{-1}$ was then obtained.

The purity of the oxygen produced by such a unit was adjusted by adjusting the incoming air flow rate until a given purity was obtained after stabilizing the cycle.

The simulated productivity in this case was taken to be 100 as control.

Taking the same system, the strand porosity was increased so as to have a foam density of only 450 kg/m$^3$, that is to say typically the strand porosity was increased from 35% to 48%, while keeping the open porosity at 45%.

The rate was then improved since the ak coefficient was then 160 s$^{-1}$.

Conversely, under these conditions, the productivity dropped to 84, because of the reduction in the amount of active material per volume.

Using the initial system again with the initial strand porosity, the open porosity was this time increased to 60%. This had an impact on the density of the foam, which fell to 400 kg/m$^3$.

The strand size was maintained at 0.400 mm so as to keep the same rate (ak=120 s$^{-1}$), the pore size then being 0.490 mm.

The productivity then dropped to 69, because of the reduction in the amount of active material per volume.

If the open porosity then dropped to 30%, the density was 711 kg/m$^3$, the strand size was then 0.400 mm and the pores were 0.260 mm in diameter.

The productivity increased to 126, because of the higher foam density, and therefore because of the higher mass of active material per unit volume.

|  | Foam density | Open porosity | Rate (ak) | Productivity |
|---|---|---|---|---|
| Control | 560 kg/m$^3$ | 45% | 120 s$^{-1}$ | 100 |
| Case 1 | 450 kg/m$^3$ | 45% | 160 s$^{-1}$ | 84 |
| Case 2 | 400 kg/m$^3$ | 60% | 120 s$^{-1}$ | 69 |
| Case 3 | 711 kg/m$^3$ | 30% | 120 s$^{-1}$ | 126 |

The simulations of the above table show the importance of using dense foams according to the invention to separate the oxygen from air and, in particular, the very deleterious effect of an open porosity of greater than 60%.

They also show the importance of maintaining a density of greater than 500 kg/m$^3$.

Furthermore, it was found to be technically difficult to manufacture a foam having a porosity of less than 20% since the percolation threshold is greater than 20%. Thus, a foam having a porosity of less than 20% is a foam with mostly closed pores, and therefore of no interest for the separation of air.

It is also possible to reach the upper limit in terms of density via the lower limit of the porosity.

In the case of a foam made of a zeolite and a ceramic binder, as in the simulations, this lower limit is around 750 kg/m$^3$. However, the density depends on the material and in the case of a foam supported on, for example, a metal backbone, it may be double or tripled.

More generally, the purification or separation process of the invention is particularly suitable for the production of oxygen in OBOGS-type units or in medical oxygen production machines, in particular in medical oxygen concentrators.

Consequently, the invention also relates to an on-board oxygen generating system (OBOGS) on an aircraft (aeroplane, helicopter, etc.) for generating oxygen from air using a process according to the invention to produce oxygen having a purity of between 50 and 96%, preferably between 60 and 93%, by volume. In this OBOGS application, the oxygen is produced in VSA or PSA mode or in a combination (VPSA) of these two. The high pressure is conventionally between about 1 and 3 bar absolute and the low pressure is between 0.1 and 0.5 bar absolute. The cycle time is between 2×2 s and 2×5 s.

Alternatively, the invention also relates to a medical oxygen concentrator comprising at least one adsorber, preferably 2 or 3 adsorbers, operating in VSA, PSA or VPSA mode so as to produce a stream of oxygen-rich gas containing at least 25% oxygen by volume using a process according to the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for purifying or separating a gas or gas mixture comprising: contacting a gas or gas mixture with a monolithic adsorbent,
    wherein said adsorbent comprises a cellular structure with an open porosity in the form of a solid foam permeable to the gas molecules, and
    wherein said solid foam comprises a density greater than or equal to about 500 kg/m$^3$ and contains an open porosity from about 20 to about 60%.

2. The process according to claim 1, wherein the open porosity of said adsorbent is from about 30 to about 50%.

3. The process according to claim 2, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

4. The process according to claim 2, wherein said adsorbent has a solid phase comprising at least about 60% by weight of at least one adsorbent material.

5. The process according to claim 4, wherein the solid phase of said adsorbent comprises at least about 70% by weight of at least one adsorbent material.

6. The process according to claim 2, wherein said adsorbent comprises a mechanical reinforcement material and/or a material having particular thermal properties which further comprises at least one component selected from the group consisting of an inorganic oxide, a ceramic, a metal, a carbon, and a polymer.

7. The process according to claim 2, wherein said adsorbent has a zeolitic phase containing at least one component selected from the group consisting of alkali metals, alkaline-earth metals, transition metals, and lanthanides.

8. The process according to claim 2, wherein said adsorbent contains metal cations selected from the group consisting of lithium, calcium, sodium, and potassium.

9. The process according to claim 2, wherein said gas is air or a mixture containing $H_2$ and CO.

10. The process according to claim 1, wherein the size of the pores of the gas phase of said adsorbent is from about 0.1 to about 10 mm.

11. The process according to claim 10, wherein the size of the pores of the gas phase of said adsorbent is from about 0.2 to about 1.5 mm.

12. The process according to claim 11, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

13. The process according to claim 11, wherein said adsorbent has a solid phase comprising at least about 60% by weight of at least one adsorbent material.

14. The process according to claim 13, wherein the solid phase of said adsorbent comprises at least about 70% by weight of at least one adsorbent material.

15. The process according to claim 11, wherein said adsorbent comprises a mechanical reinforcement material and/or a material having particular thermal properties which further comprises at least one component selected from the group consisting of an inorganic oxide, a ceramic, a metal, a carbon, and a polymer.

16. The process according to claim 11, wherein said adsorbent has a zeolitic phase containing at least one component selected from the group consisting of alkali metals, alkaline-earth metals, transition metals, and lanthanides.

17. The process according to claim 11, wherein said gas is air or a mixture containing $H_2$ and CO.

18. The process according to claim 10, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

19. The process according to claim 10, wherein said adsorbent has a solid phase comprising at least about 60% by weight of at least one adsorbent material.

20. The process according to claim 19, wherein the solid phase of said adsorbent comprises at least about 70% by weight of at least one adsorbent material.

21. The process according to claim 10, wherein said adsorbent comprises a mechanical reinforcement material and/or a material having particular thermal properties which further comprises at least one component selected from the group consisting of an inorganic oxide, a ceramic, a metal, a carbon, and a polymer.

22. The process according to claim 10, wherein said adsorbent has a zeolitic phase containing at least one component selected from the group consisting of alkali metals, alkaline-earth metals, transition metals, and lanthanides.

23. The process according to claim 10, wherein said adsorbent contains metal cations selected from the group consisting of lithium, calcium, sodium, and potassium.

24. The process according to claim 10, wherein said gas is air or a mixture containing $H_2$ and CO.

25. The process according to claim 1, wherein the density of said adsorbent is from about 500 kg/m$^3$ to about 900 kg/$^3$.

26. The process according to claim 1, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

27. The process according to claim 1, wherein said adsorbent has a solid phase comprising at least about 60% by weight of at least one adsorbent material.

28. The process according to claim 27, wherein the solid phase of said adsorbent comprises at least about 70% by weight of at least one adsorbent material.

29. The process according to claim 1, wherein said adsorbent comprises a mechanical reinforcement material and/or a material having particular thermal properties which further comprises at least one component selected from the group consisting of an inorganic oxide, a ceramic, a metal, a carbon, and a polymer.

30. The process according to claim 1, wherein said adsorbent has a zeolitic phase containing at last one component selected from the group consisting of alkali metals, alkaline-earth metals, transition metals, and lanthanides.

31. The process according to claim 1, wherein said adsorbent contains metal cations selected from the group consisting of lithium, calcium, sodium, and potassium.

32. The process according to claim 31, wherein said adsorbent contains lithium metal cations.

33. The process according to claim 1, wherein said gas is air or a mixture containing $H_2$ and CO.

34. The process according to claim 1, wherein said gas is air.

35. The process according to claim 1, wherein said process further comprises:
producing at least one gas selected from the group consisting of oxygen, hydrogen, $CH_4$, CO, $CO_2$, and nitrogen.

36. The process according to claim 35, wherein said process further comprises:
producing a stream of oxygen-enriched gas.

37. The process according to claim 35, wherein said process produces oxygen on board a vehicle (OBOGS) from air, and
wherein said oxygen comprises a purity from about 50 to about 96% by volume.

38. The process according to claim 37, wherein said oxygen comprises a purity from about 60 to about 93%, by volume.

39. The process according to claim 35, wherein a medical oxygen concentrator comprises at least one adsorber, operating in a VSA, PSA, or VPSA, mode, and,
wherein said adsorber produces a stream of oxygen-rich gas containing at least about 25% oxygen by volume.

40. The process according to claim 35, wherein said adsorbent produces at least one gas selected from the group consisting of oxygen, hydrogen, $CH_4$, CO, $CO_2$, and nitrogen.

41. The process according to claim 35, wherein the process comprises a further step of:

removing at least one impurity selected from the group consisting of $H_2O$, $CO_2$, $N_xO_y$, and unsaturated and saturated hydrocarbons.

42. The process according to claim 1, wherein said process further comprises:
removing at least one impurity selected from the group consisting of $H_2O$, $CO_2$, $N_xO_y$, unsaturated, and saturated hydrocarbons.

43. The process according to claim 1, wherein said process is selected from the group consisting of VSA, PSA, and TSA.

44. The process according to claim 1, wherein a medical oxygen concentrator comprises at least two adsorbers, operating in a VSA, PSA, or VPSA, mode, and
wherein said adsorber produces a stream of oxygen-rich gas containing at least about 25% oxygen by volume.

45. The process according to claim 1, wherein a medical oxygen concentrator comprises at least three adsorbers operating in a VSA, PSA, or VPSA, mode, and
wherein said adsorber produces a stream of oxygen-rich gas containing at least about 25% oxygen by volume.

46. The process according to claim 1, wherein said process is selected from the group consisting of VSA, PSA, and VPSA,.

47. An apparatus for purifying or separating a gas or gas mixture with a monolithic adsorbent that comprises:
i) a cellular structure with an open porosity in the form of a solid foam permeable to gas molecules, and
ii) wherein said solid foam comprises a density greater than or equal to about 500 kg/m$^3$ and contains an open porosity from about 20 to about 60%.

48. The apparatus according to claim 47, wherein the open porosity of said adsorbent is from about 30 to about 50%.

49. The apparatus according to claim 48, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

50. The apparatus according to claim 48, wherein the solid phase of said adsorbent comprises at least about 60% by weight of at least one adsorbent material.

51. The apparatus according to claim 50, wherein the solid phase of said adsorbent comprises at least about 70% by weight of at least one adsorbent material.

52. The apparatus according to claim 48, wherein said adsorbent comprises a mechanical reinforcement material and/or a material having a particular thermal properties which further comprises at least one component selected from the group consisting of an inorganic oxide, a ceramic, a metal, a carbon, a polymer.

53. The apparatus according to claim48, wherein said adsorbent has a zeolitic phase containing at least one component selected from the group consisting of: alkali metals, alkaline-earth metals, transition metals, and lanthanides.

54. The apparatus according to claim 48, wherein said adsorbent contains metal cations selected from the group consisting of lithium, calcium, sodium, and potassium.

55. The apparatus according to claim 48, wherein said apparatus comprises means to purify and/or separate at least one gas selected from the group consisting of: air, $H_2O$, and CO.

56. The apparatus according to claim 48, wherein said adsorbent comprises means to produce at least one gas selected from the group consisting of oxygen, hydrogen, $CH_4$, CO, $CO_2$, and nitrogen.

57. The apparatus according to claim 56, wherein said apparatus comprises means to remove at least one impurity selected from the group consisting of $H_2O$, $CO_2$, $N_xO_y$, and unsaturated and saturated hydrocarbons.

58. The apparatus according to claim 47, wherein the size of the pores of said adsorbent is from about 0.1 to about 10 nm.

59. The apparatus according to claim 58, wherein the size of the pores of the gas phase of said adsorbent is from about 0.2 to about 1.5 mm.

60. The apparatus according to claim 59, wherein said adsorbent consists of a solide phase comprising at least about 40% by weight of at least one adsorbent material comprising a zeolite, silica gel, activated alumina, or active carbon, and the balance consisting of at least one mechanical reinforcement material and/or a material having particular thermal properties.

61. The apparatus according to claim 59, wherein the solid phase of said adsorbent comprises at least about 60% by weight of at least one adsorbent material.

62. The apparatus according to claim 61, wherein the solid phase of said adsorbent comprises at least about 70% by weight of at least one adsorbent material.

63. The apparatus according to claim 59, wherein said adsorbent comprises a mechanical reinforcement material and/or a material having particular thermal properties which further comprises at least one component selected from the group consisting of an inorganic oxide, a ceramic, a metal, a carbon, and a polymer.

64. The apparatus according to claim 59, wherein said adsorbent has a zeolitic phase containing at least one component selected from the group consisting of: alkali metals, alkaline-earth metals, transition metals, and lanthanides.

65. The apparatus according to claim 59, wherein said apparatus comprises means to purify and/or separate at least one gas selected from the group consisting of: air, $H_2O$, and CO.

66. The apparatus according to claim 58, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

67. The apparatus according to claim 58, wherein the solid phase of said adsorbent comprises at least about 60% by weight of at least one adsorbent material.

68. The apparatus according to claim 67, wherein the solid phase of said adsorbent comprises at least about 70% by weight of at least one adsorbent material.

69. The apparatus according to claim 58, wherein said adsorbent comprises a mechanical reinforcement material and/or a material having particular thermal properties which further comprises at least one component selected from the group consisting of an inorganic oxide, a ceramic, a metal, a carbon, and a polymer.

70. The apparatus according to claim 58, wherein said adsorbent has a zeolitic phase containing at least one component selected from the group consisting of: alkali metals, alkaline-earth metals, transition metals, and lanthanides.

71. The apparatus according to claim 58, wherein said adsorbent contains metal cations selected from the group consisting of lithium, calcium, sodium, and potassium.

72. The apparatus according to claim 58, wherein said apparatus comprises means to purify and/or separate at least one gas selected from the group consisting of: air, $H_2$, and CO.

73. The apparatus according to claim 47, wherein the density of said adsorbent is from about 500 $kg/m^3$ to about 900 $kg/m^3$.

74. The apparatus according to claim 47, wherein said adsorbent consists of a solid phase comprising at least about 40% by weight of at least one adsorbent material comprising a zeolite, silica gel, activated alumina, or active carbon, and the balance consisting of at least one mechanical reinforcement material and/or a material having particular thermal properties.

75. The apparatus according to claim 47, wherein the solid phase of said adsorbent comprises at least about 60% by weight of at least one adsorbent material.

76. The apparatus according to claim 75, wherein the solid phase of said adsorbent comprises at least about 70% by weight of at least one adsorbent material.

77. The apparatus according to claim 47, wherein said adsorbent comprises a mechanical reinforcement material and/or a material having particular thermal properties which further comprises at least one component selected from the group consisting of an inorganic oxide, a ceramic, a metal, a carbon, and a polymer.

78. The apparatus according to claim 47, wherein said adsorbent has a zeolitic phase containing at least one component selected from the group consisting of: alkali metals, alkaline-earth metals, transition metals, and lanthanides.

79. The apparatus according to claim 47, wherein said adsorbent contains metal cations selected from the group consisting of lithium, calcium, sodium, and potassium.

80. The apparatus according to claim 79, wherein said adsorbent contains lithium metal cations.

81. The apparatus according to claim 47, wherein said apparatus comprises means to purify and/or separate at least one gas selected from the group consisting of: air, $H_2$, and CO.

82. The apparatus according to claim 47, wherein said apparatus comprises means to produce at least one gas selected from the group consisting of oxygen, hydrogen, $CH_4$, CO, $CO_2$, and nitrogen.

83. The apparatus according to claim 82, wherein said apparatus comprises means to produce oxygen on board a vehicle (OBOGS) from air and wherein said oxygen comprises a purity from about 50 to about 96% by volume.

84. The apparatus according to claim 83, wherein said oxygen comprises a purity from about 60 to about 93%, by volume.

85. The apparatus according to claim 83, wherein said apparatus has the means to produce oxygen-rich gas for at least one device installed on board a vehicle and participates in the traction of the vehicle and/or its electrical supply.

86. The apparatus according to claim 85, wherein said apparatus has the means to produce oxygen-rich gas to at least one device installed on board a vehicle and participating in the traction of the vehicle and/or its electrical supply is a fuel cell.

87. The apparatus according to claim 47, wherein said apparatus comprises means to remove at least one impurity selected from the group consisting of $H_2O$, $CO_2$, $N_xO_y$, and unsaturated and saturated hydrocarbons.

* * * * *